May 3, 1949.  H. G. LANE  2,469,044
ADJUSTABLE PLOW SWEEP
Filed May 7, 1946  2 Sheets-Sheet 1
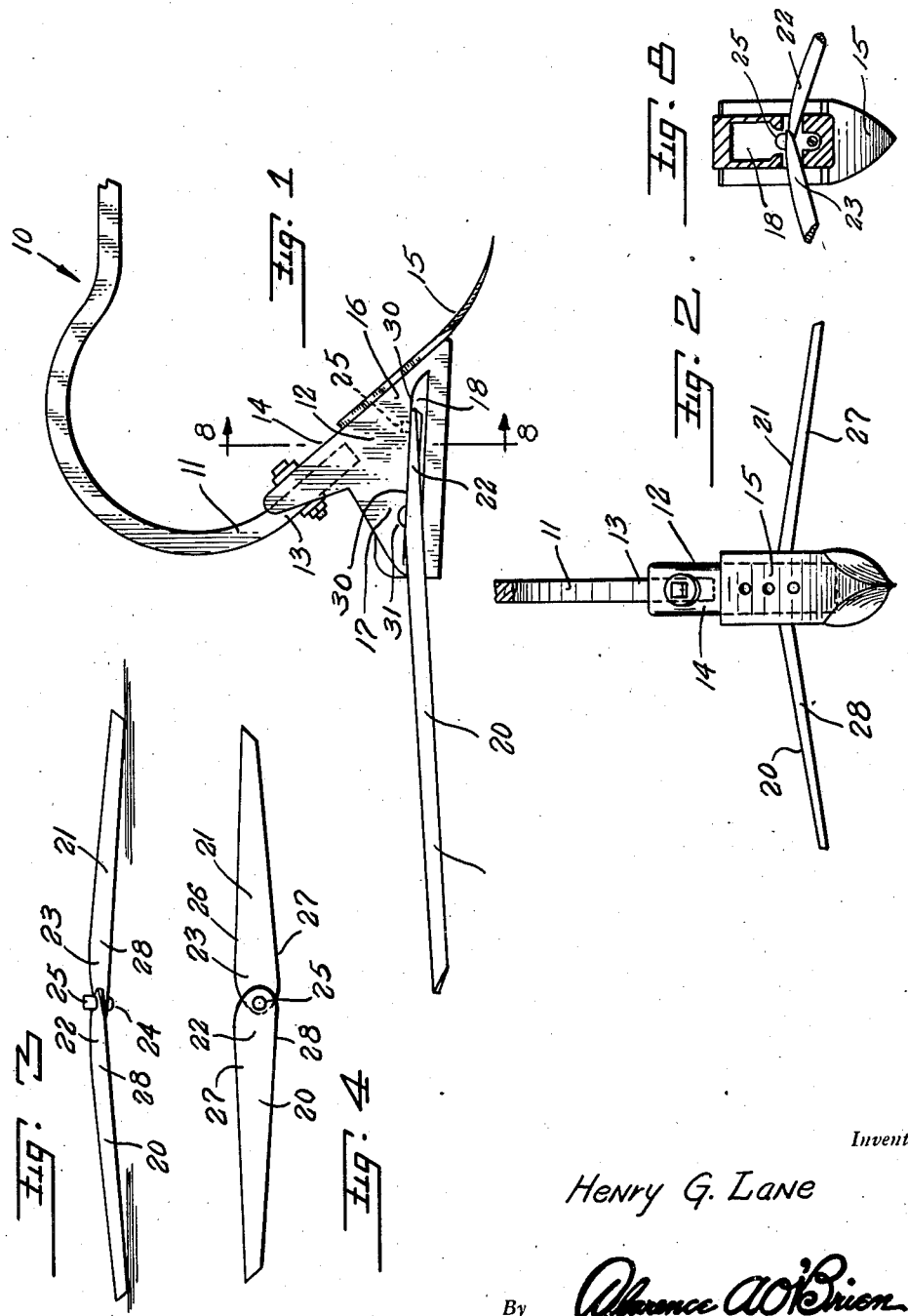
Inventor
Henry G. Lane May 3, 1949.  H. G. LANE  2,469,044
ADJUSTABLE PLOW SWEEP
Filed May 7, 1946  2 Sheets-Sheet 2
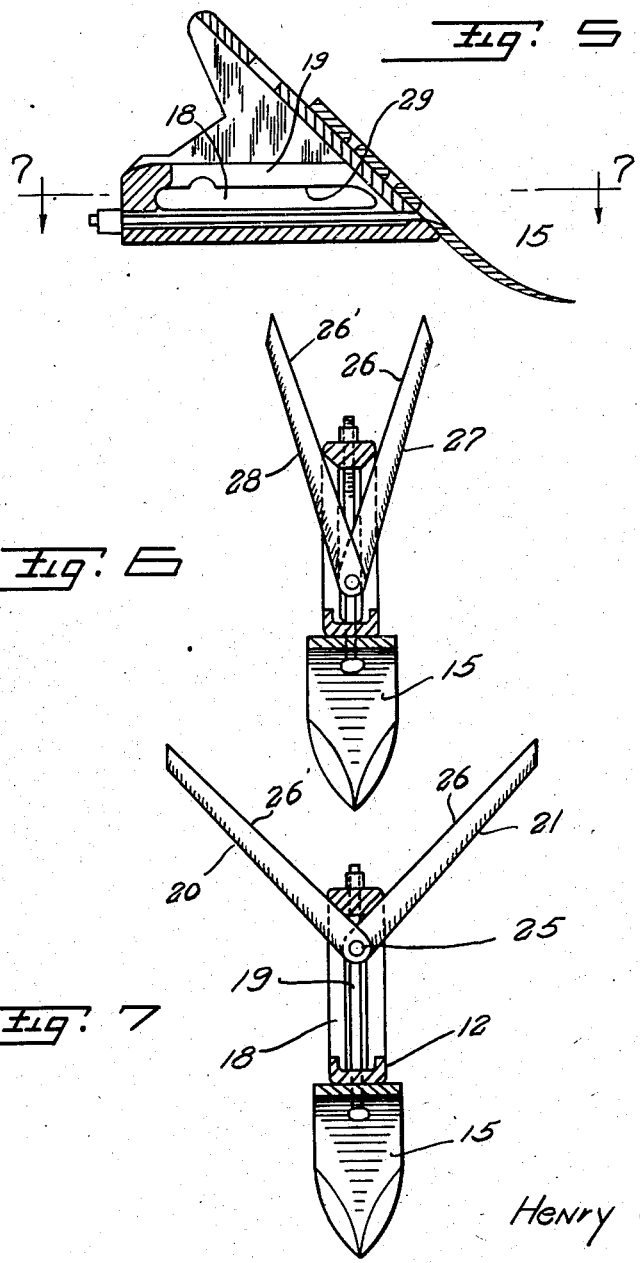
Inventor
Henry G. Lane
By Clarence A. O'Brien
and Harvey B. Jacobson
Attorneys Patented May 3, 1949

2,469,044

UNITED STATES PATENT OFFICE 2,469,044

ADJUSTABLE PLOW SWEEP

Henry G. Lane, Bainbridge, Ga.

Application May 7, 1946, Serial No. 667,880

7 Claims. (Cl. 97—205)

My invention relates to agricultural implements and has for an object to provide in a plow adjustable side wings or sweeps.

Another object of this invention is to provide a plow having self-locking sweeps.

A further object of this invention is to provide in a cultivator plow longitudinally and laterally adjustable sweeps.

Other features and advantages will become more readily apparent from the following description and the accompanying illustrative drawings in which:

Figure 1 is a side elevational view of my improved cultivator plow,

Figure 2 is a front elevational view thereof,

Figure 3 is a detail edge view of the sweeps,

Figure 4 is a plan view thereof,

Figure 5 is a vertical section of the plow share,

Figure 6 is another sectional view thereof,

Figure 7 is a sectional view taken on line 7—7 of Figure 5, and

Figure 8 is a transverse section of the inner ends of the sweeps shown partially closed upon one another.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device, which is to be limited only in accordance with the appended claims. And while I have stated the primary field of utility of my invention it remains obvious that it may be employed in any other capacity wherein it may be found applicable.

Like reference characters in the drawings and specification indicate like parts and 10, indicates my adjustable cultivator plow which consists of a beam 11, having a post or shoe 12, which may or may not be integrally connected with the beam foot 13. The forward ridge 14, of member 12, is inclined to receive the shovel 15. Projecting rearwardly of the terminal 16, of the shoe is an extension 17, in which is provided a longitudinal horizontal slot 18, above which is a coinciding vertical groove 19, the purpose of which will presently appear.

A pair of side sweeps 20 and 21, are pivotally connected at their ends 22 and 23, by a rivet 24, having a relatively large square head 25. The inner edge portions 26 and 26', of the sweeps are beveled, the thicker portions being at the forward or outer edges 27 and 28, thereof. These sweeps operate through the slot 18, the pivot point thereof being centered in said slot and the rivet head 25, projecting up into the said groove 19, and is held in the groove through the leverage exerted by the projecting ends of the sweeps. As shown clearly in Figure 1 of the drawings, the end 22, of sweep 20, overlaps end 23, of sweep 21, whereby the sweeps have scissor action relative to one another, but due to the cross sectional wedge-shape thereof they will readily bind upon one another when adjusted to sweep any desired width of ground and dropped to a desired longitudinal adjusted position within the slot 18, the above referred to leverage forcing the pivotal ends of the sweeps up against the edges 29 and 30, above the slot 18. The wedging action of this arrangement is such that when once adjusted, the sweeps are held securely fixed until manually readjusted. A cut out 31, is provided in the edge 30, for passage of the rivet head 25, whereby the sweeps may be quickly removed from the plow.

From the foregoing it will be seen that I have provided a shovel plow or cultivator with sweeps so formed that they may be instantly adjusted or removed without the use of any tool.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

1. In combination with a plow, a pair of adjustable sweeps, a rivet pivotally connecting said sweeps at their inner terminals, said sweeps being thickened rearwardly of the pivot and beveled on the inner edges at said thickened portions, said pivot having an enlarged upper head, a plow shoe having a horizontal slot to receive the sweeps and a groove over the slot to receive said head to retain the sweeps to the shoe and means whereby the head may be entered into the groove, said inner terminals of said sweeps having a binding action in said slot.

2. In combination with a plow, a pair of adjustable sweeps, a rivet pivotally connecting said sweeps at their inner terminals, said sweeps being thickened rearwardly of the pivot and beveled on the inner edges at said thickened portions, said pivot having an enlarged upper head, a plow shoe having a horizontal slot to receive the sweeps and a groove over the slot to receive said head to retain the sweeps to the shoe, said inner terminals of said sweeps having a binding action in said slot.

3. In combination with a plow, a pair of adjustable sweeps, a rivet pivotally connecting said sweeps at their inner terminals, said sweeps being thickened rearwardly of the pivot and beveled on the inner edges at said thickened portions, said pivot having an enlarged upper head, a plow shoe having a horizontal slot to receive the sweeps and a groove over the slot to receive said head, said inner terminals of said sweeps having a binding action in said slot.

4. In combination with a plow, a pair of adjustable sweeps, a rivet pivotally connecting said sweeps at their inner terminals, said sweeps being thickened rearwardly of the pivot and beveled on the inner edges at said thickened portions, said pivot having an enlarged upper head, and a plow shoe having a horizontal slot to receive the sweeps, said inner terminals of said sweeps having a binding action in said slot.

5. In combination with a plow, a pair of adjustable sweeps, means pivotally connecting the inner ends of said sweeps, and a plow shoe having a slot engaging the pivoted ends of said sweeps, said inner ends of said sweeps having a binding action in said slot, said sweeps being thickened outwardly of the pivot means and beveled on the inner edges of said thickened portions.

6. The combination of claim 5 wherein said slot is substantially horizontal.

7. The combination of claim 5 wherein said pivot means includes a rivet having an enlarged head, and a longitudinal groove provided in said plow shoe communicating with said slot, and slidably engaging the head of said rivet.

HENRY G. LANE.

REFERENCES CITED

The following references are of record in the file of this patent:

UNITED STATES PATENTS

| Number | Name | Date |
| --- | --- | --- |
| 532,012 | Roop | Jan. 1, 1895 |
| 1,851,190 | Lane | Mar. 29, 1932 |